United States Patent [19]
Morton

[11] 3,880,627
[45] Apr. 29, 1975

[54] FILTER WITH INTEGRAL HOUSING
[75] Inventor: David W. Morton, Minneapolis, Minn.
[73] Assignee: Donaldson Company, Inc., Minneapolis, Minn.
[22] Filed: July 2, 1973
[21] Appl. No.: 375,484

[52] U.S. Cl. .................. 55/499; 55/502; 55/521; 210/446; 210/493
[51] Int. Cl. .......................................... B01d 27/06
[58] Field of Search ............ 55/497, 498, 500, 502, 55/521, 499; 210/493 R, 493 B, 446

[56] References Cited
UNITED STATES PATENTS

| | | | |
|---|---|---|---|
| 2,135,863 | 11/1938 | Walker | 55/521 UX |
| 2,737,258 | 3/1956 | Harlow | 55/156 X |
| 2,879,207 | 3/1959 | Poitras | 210/446 X |
| 2,915,426 | 12/1959 | Poelman | 55/521 UX |
| 3,161,491 | 12/1964 | Gongoll et al. | 55/502 |
| 3,296,781 | 1/1967 | Schumann | 55/504 |
| 3,341,013 | 9/1967 | Moulton | 55/502 X |
| 3,353,341 | 11/1967 | Stripp | 55/511 X |
| 3,471,023 | 10/1969 | Rosaen | 210/493 X |
| 3,475,884 | 11/1969 | Kulzer | 248/99 X |
| 3,494,466 | 2/1970 | Rose et al. | 210/493 |
| 3,513,982 | 5/1970 | Carter et al. | 210/435 |
| 3,520,416 | 7/1970 | Keedwell | 210/508 X |
| 3,712,033 | 1/1973 | Gronholz | 55/493 |
| 3,765,537 | 10/1973 | Rosenberg | 210/499 X |
| 3,815,754 | 6/1974 | Rosenberg | 210/493 |

Primary Examiner—Bernard Nozick
Attorney, Agent, or Firm—Merchant, Gould, Smith & Edell

[57] ABSTRACT

A pair of U-shaped housing members are oppositely disposed with leg portions of one member telescopically received between leg portions of the other member to form a housing. An inlet is formed in one housing member and an outlet is formed in the other housing member. Cup-shaped end walls engage and embrace opposite end edges of the housing. A pleated filter is positioned in the housing with its opposite end pleats, and a seal positioned adjacent each thereof, disposed between adjacent telescoped leg portions. An adhesive material partially fills each of the cup-shaped end walls and has an adjacent portion of the pleated filter and an adjacent end edge of the housing embedded therein. The adhesive material cooperates with the seals between the leg portions to secure and seal the pleated filter in the housing to provide a filtering medium between the inlet and outlet and bond the filter assembly into an integral unit.

8 Claims, 4 Drawing Figures

PATENTED APR 29 1975 3,880,627
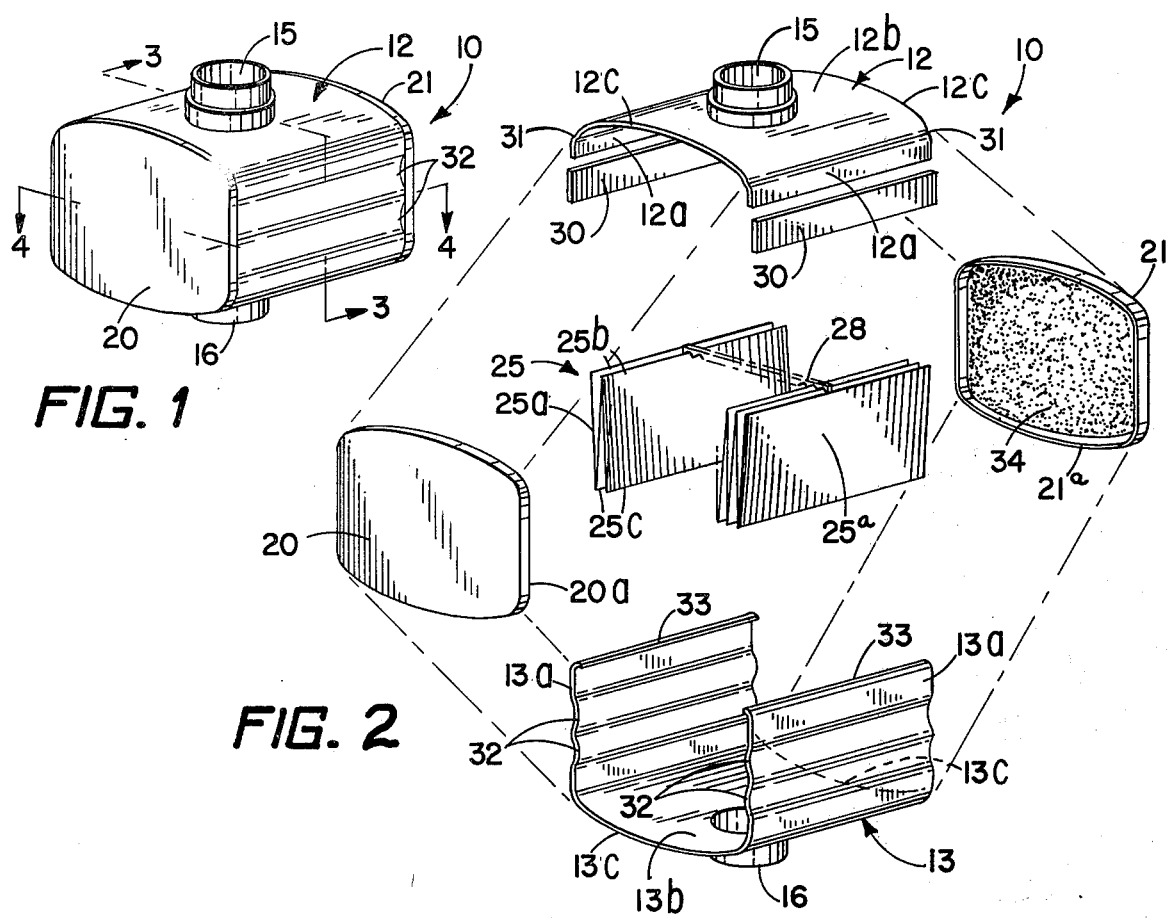
FIG. 1
FIG. 2
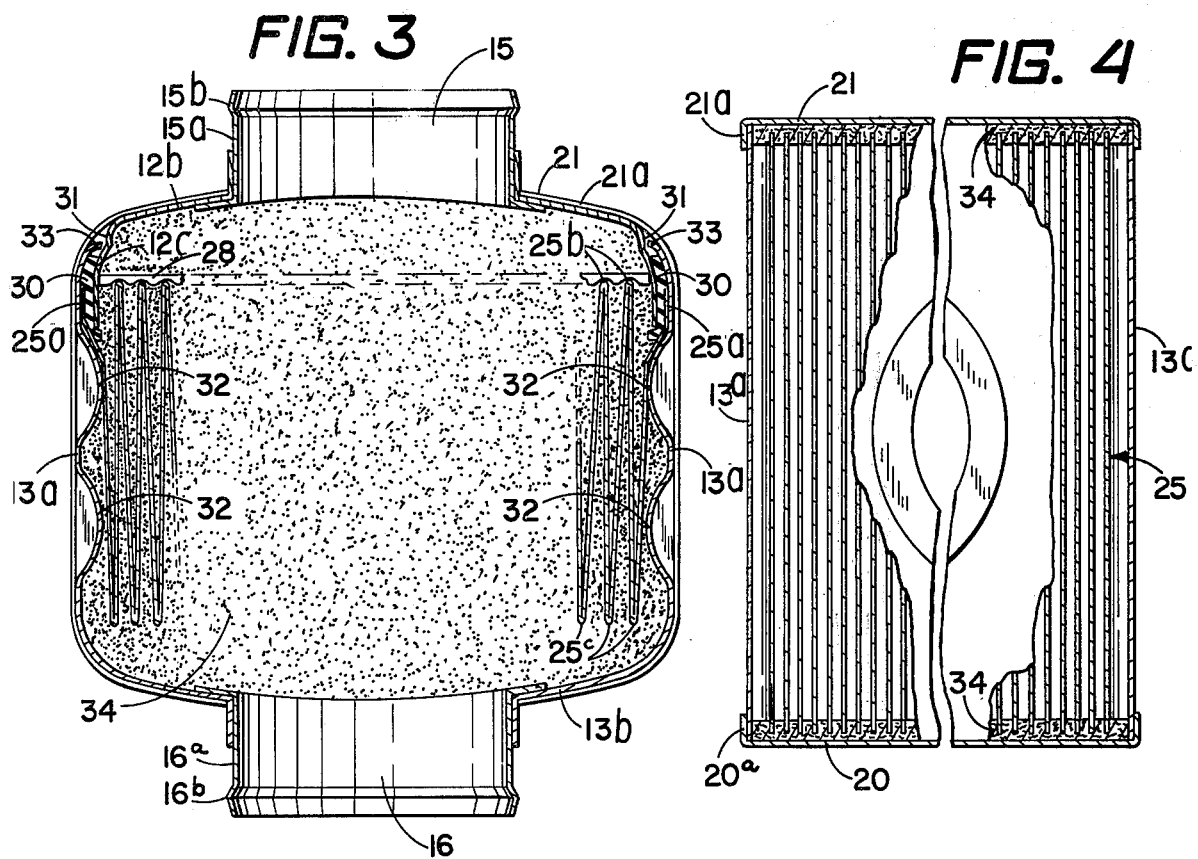
FIG. 3
FIG. 4

3,880,627

FILTER WITH INTEGRAL HOUSING

BACKGROUND OF THE INVENTION

1. Field of the Invention

The present invention relates generally to filtering devices and more specifically is directed to an integrally formed air filter assembly of the throw-away type.

2. Description of the Prior Art

Presently used air cleaners of the above type generally take a cylindrical form and have only two dimensions, the length and the diameter, which can be changed to vary the filtering capacity of the filter assembly. In addition, these filters generally require considerable internal volume to distribute unfiltered air to the filtering surface of the filter element and to direct filtered air from the filter element. This results in a filter of considerable housing bulk. Conventional dry air cleaners are provided with pleated filter elements which must be periodically serviced. This is accomplished by disassembly and cleaning of the air cleaner housing as well as replacement of the pleated filter element. Replacement filter elements are provided with only marginal protection against shipping and handling damage to the critical pleated filter element, with the result that damaged replacement filter elements may not provide the protection expected from them. Also, such air cleaners require considerable skill to service and on occasion the filter element may be left entirely out of the air cleaner. This omission is not readily detectable and may result in expensive damage to the engine.

SUMMARY OF THE INVENTION

The present invention provides a filter design that will give long service life with improved performance reliability. The filter assembly has a configuration that will fit or can be readily modified to fit a variety of limited installation space configurations with relatively low tooling and unit cost to the manufacturer. The filter housing can be constructed from various materials such as metals, reinforced thermosetting plastics and thermoplastics, and the filtering medium can be constructed from treated paper, felt or plastic foam. This wide selection of construction materials for the filter housing, as well as for the filter medium, provides a filter assembly having a basic design in which the dimensions and proportions thereof can be easily varied to meet the needs of individual installation of the filter assembly. With this in mind, a pair of U-shaped housing members each having spaced leg portions and a connecting portion connecting the leg portions is provided. The U-shaped housing members are oppositely disposed with leg portions of one of the U-shaped housing members telescopically received between the leg portions of the other U-shaped member to form a housing which is generally rectangular in cross section. An inlet and outlet are formed one in each of the connecting portions of the leg portions. A cup-shaped end wall member engages each opposite end edge of the housing with a peripheral flanged portion of each cup-shaped end wall member embracing an adjacent one of the end edges. A filter element in the housing extends between the telescoped leg portions. The filter element includes spaced end portion one received between each of the telescoped leg portions to secure the filter element to the telescoped leg portions. A seal member is positioned between each of the telescoped leg portions. An adhesive, partially filling each of the cup-shaped end walls, embeds and seals adjacent edges of the filter element and end edges of the housing to provide a filtering medium between the inlet and outlet and bond the filter assembly into a permanent integral, disposable unit.

BRIEF DESCRIPTION OF THE DRAWINGS

FIG. 1 is a view in perspective of a filter with an integral housing constructed in accordance with the present invention;

FIG. 2 is a view in exploded perspective illustrating the relationship of the various parts of the structure of FIG. 1;

FIG. 3 is a view in vertical section as seen generally from the line 3—3 of FIG. 1, on an enlarged scale; and FIG. 4 is an enlarged view in horizontal section as seen generally from the line 4—4 of FIG. 1, portions thereof being broken away.

DESCRIPTION OF THE PREFERRED EMBODIMENT

FIG. 1 illustrates a filter assembly having a housing indicated generally by the reference numeral 10. Housing 10 is formed by a pair of housing members 12 and 13. Each housing member 12, 13 has a generally U-shaped configuration which includes spaced, parallel, wall-like leg portions 12a, 13a and connecting wall portions 12b, 13b which connect respective leg portions 12a, 13a. The housing members 12, 13 are oppositely disposed with leg portions 12a of housing member 12 telescopically received between leg portions 13a of housing member 13. The leg portions 12a, 13a and connecting portions 12b, 13b have opposite end edges 12c, 13c which terminate in common parallel planes when the leg portions 12a, 13a are overlapped as in FIGS. 1 and 3.

An inlet 15 and an outlet 16 are formed one in each of the connecting portions 12c, 13c. The inlet 15 and outlet 16 are each formed by a short tubular conduit 15a, 16a extending laterally from a respective connecting portion 12b, 13b. Each tubular conduit 15a, 16a includes an annular ridge 15b, 16b formed at a respective extended end thereof to aid in securing hose-like extensions, not shown, to the short conduits 15a, 16a during installation of the housing 10. For convenience of description, inlet 15 is shown in connecting portion 12b and outlet 16 is shown in connecting portion 13b. However, it will become apparent hereinafter that the position of the inlet and outlet 15, 16 may be reversed (e.g. inlet 15 may be positioned in connecting portion 13c while outlet 16 may be positioned in connecting portion 12c).

Opposed end wall members 20, 21 each have peripherally extended flange portions 20a, 21a respectively which impart a cup-shaped configuration to the end wall members 20, 21. Each end wall member 20, 21 engages one of the opposite end edges 12c, 13c with a respective flange 20a, 21a embracing the telescoped leg and connecting portions 12a, 12b and 13a, 13b at an adjacent one of the end edges 12c, 13c. Thus, it can be seen by reference to FIGS. 1 and 3 of the drawings that the embracing position of the flanges 20a, 21a tends to maintain the housing members 12, 13 in their assembled position.

Prior to assembly of the end walls 20, 21 to the telescoped housing members 12, 13, filter means, in the nature of a pleated filter element 25, are positioned in the housing 10. The pleated filter element 25 is positioned to extend between the end walls 20, 21 and telescoped leg portions 12a, 13a. Spaced filter portions or end pleats 25a of the pleated filter element 25 are received one between each of the telescoped leg portions 12a, 13a to anchor the end pleats 25a to adjacent ones of the telescoped leg portions 12a, 13a. In the embodiment shown, the filter element 25 is constructed from a treated paper formed into a plurality of side by side pleats. However, the filter element 25 may just as easily be formed from other porous materials such as felt and plastic foam and in forms other than pleats. In all cases, however, spaced portions such as end pleats 25a must be provided and positioned between the telescoped leg portions 12a, 13a. As shown, the pleated filter element 25 defines a plurality of spaced apart peaks 25b spaced from the inlet 15 and connecting portion 12b. Filter element 25 also defines a plurality of oppositely facing spaced apart peaks 25c spaced from the outlet 16 and connecting portion 13b. Peaks 25b, 25c each have a longitudinal dimension which extends between the end walls 20, 21.

A spacer member 28 is secured to the peaks 25b midway between the end walls 20, 21, by means of a suitable adhesive, to space each peak 25b from an adjacent peak 25b. Spacer member 28 extends between the spaced telescoped leg portions 12a to aid in stabilizing the pleated filter 25 within the housing 10. The spacer member 28 is mounted on peaks 25b adjacent the inlet 15 so that a maximum of filtering surface it presented to unfiltered air entering the inlet 15. Also, peaks 25b, 25c are spaced from the inlet 15, outlet 16 and respective connecting well portions 12b, 13b to provide for adequate passage of unfiltered air to all of the exposed filtering surfaces and to provide unrestricted passage of filtered air from the filter element 25 to the outlet 16. A plurality of spacer members can be used if desired. Further, other forms of spacer members, such as a parallel series of adhesive beads, can be used. An effective method of spacing deep pleats of the kind herein contemplated is disclosed in the Poelman U.S. Pat. No. 2,915,426, the teachings of which are incorporated herein by reference. If it should be desired to use the filter assembly in a bi-directional mode (e.g. wherein the inlet 15 and outlet 16 would be reversible) one or more spacer members (not shown) should be secured to the opposite side of the pleats.

Seal means, such as a seal or gasket 30, are disposed between each of the overlapping leg portions 12a, 13a to seal the connective joint formed thereby. Seal 30 is formed from an elongated flat strip of polyurethane foam and is elongated in a direction to extend between the opposite end edges 12c, 13c of housing members 12, 13 respectively. Seal 30 also acts to seal and secure a respective end pleat 25 between it and the respective telescoped leg portions 12a, 13a.

Present day cost factors dictate that the materials from which housings of throw-away type filter assemblies are constructed be of a minimum thickness dimension. This often leads to structures which are unable to absorb accidental impact. Upon such impact, they often sustain sufficient damage to render the filter inoperative. The present invention provides a housing 10 having a configuration which permits the use of a variety of materials in the construction thereof as well as materials which have a minimum thickness dimension. As shown, the housing 10 takes the form of a generally cross-sectionally rectangular shape. Normally, such a shape would result in generally planar wall members which would be highly susceptible to deformation during accidental impact with the result that adequate seals at the various joints of the housing 10 would be hard to maintain. To alleviate this problem the connecting portions 12b, 13b of housing members 12, 13 each have a cross-sectionally arcuate shape to add a desired degree of rigidity thereto. Also, leg portions 12a of housing 12 are of equal length with each other but are substantially shorter than leg portions 13a of housing member 13. As such the longer leg members 12a define a planar expanse of somewhat greater area. Thus, leg portions 13a need additional reinforcement and are each formed with inwardly projecting ribs 32. Ribs 32 each extend between opposite end edges 13c of respective leg portions 13a with one rib 32 on each leg portion 13a in close proximity to the portion having a telescoped relationship with respective legs 12a. This provides the desired rigidity to maintain an adequate sealing engagement along the joints formed by the telescoped leg portions 12a, 13a as well as stiffening the entire planar expanse of each leg 13a. An inwardly turned lip 33 extends along the extended edge of each leg portion 13a between the end edges 13c thereof. This lip 33 not only imparts still further rigidity to the leg portions 13 but helps to retain respective seals 30 in position between the telescoped leg portions 12a, 13a.

Before positioning the end walls 20, 21 in engagement with respective end edges 12c, 13c of the housing members 12, 13, each cup-shaped end wall 20, 21 is partially filled with securing means in the nature of an adhesive or bonding agent 34. The adhesive or bonding agent 34 is initially in a liquid form which solidifies to bond the entire assembly into a permanent integral unit. Many suitable hot melt thermoplastic adhesives or bonding agents are commercially available. When the end walls 20, 21 are positioned in engagement with a respective end edge 12c, 13c, appropriate action is taken to cause the liquid adhesive 34 to solidify (e.g. the adhesive 34 is solidified by air or heat curing, by solvent evaporation, etc.). With the end walls 20, 21 engaged with respective end edges 12c, 13c, adjacent ends of the pleats of filter element 25 and the end edges 12c, 13c become embedded in the solidified adhesive. This securely positions the pleated filter 25 within the housing 10 between the inlet 15 and outlet 16 and bonds the entire assembly into a permanent integral throw-away filter unit.

Although a sponge-like or gasket-like polyurethane foam is used as the seal 30 in the preferred embodiment, other flexible, rubber-like materials could be used as well. For example, a bead of silicone adhesive could be applied to one or both sides of the joint and the housing then assembled, permitting the adhesive to cure to form a solid, flexible seal.

Each seal 30 has dual functions. As best shown in FIG. 3, they provide a seal between the filter media end pleats 25a and the housing leg portions 12a. The seals 30 also extend above the end pleats to seal directly together the housing leg portions 12a–13a to seal the housing against leakage from the outside of the joints.

In the preferred embodiment shown in the drawing, the two leg portions 12a are of equal length, and the two leg portions 13a are also equal but longer than leg portions 12a. The two housing members 12, 13 can also be designed so that they have the same configuration, with each having one short and one long leg portion. One joint would then be close to the inlet and the other joint close to the outlet. Each joint would be formed with the longer leg overlapping the shorter leg. The advantage of this alternate construction is that both housing members 12, 13 would be identically constructed, thus reducing the number of parts required.

What is claimed is:

1. A filter assembly comprising:
   a. a housing including a pair of oppositely disposed housing members each having two spaced, outer, generally parallel wall-like leg portions, said leg portions of one thereof being telescopically received in transversely overlapping relation between said leg portions of the other to form there between a pair of connective joints;
   b. each housing member having a connecting wall portion connecting said leg portions, said leg portions and connecting portions having opposite end edges terminating in substantially parallel planes when said leg portions are telescoped;
   c. inlet and outlet means formed one in each of said housing members;
   d. opposed end wall members engaging said end edges;
   e. filter means in said housing spaced from each of said connecting portions and including spaced end portions one inserted between said leg portions in each of said connective joints to anchor said filter means to said housing members;
   f. seal means disposed with said filter end portions in each of said connective joints; and
   g. means securing said filter means to said end wall members.

2. The structure of claim 1 wherein said pair of housing members each have a U-shaped configuration and wherein said walllike leg portions on each housing member are of substantially identical length, said leg portions of one housing member being substantially shorter than said leg portions of said other housing member.

3. The structure of claim 1 wherein said filter means is a pleated filter element and wherein opposite end pleats of said pleated filter element form said filter end portions.

4. The structure of claim 3 wherein said seal means for each connective joint is formed from an elongated flat strip of flexible material, and extends longitudinally between the opposite ends of said leg portions to seal said corresponding end pleats, in the connective joint formed by said telescoped leg portions.

5. The structure of claim 3 wherein said pleated filter defines a plurality of oppositely facing spaced apart peaks disposed in a spaced relationship to said inlet and outlet, and wherein spacer means are provided to space each peak adjacent the inlet from an adjacent peak.

6. A filter assembly comprising:
   a. a housing including a pair of oppositely disposed generally U-shaped housing members each having two spaced generally parallel wall-like leg portions, said leg portions overlapping to form there between a pair of connective joints;
   b. each housing member having a connecting wall portion connecting said leg portions, said leg portions and connecting wall portions having opposite end edges terminating in substantially parallel planes;
   c. inlet and outlet means formed one in each of said housing members;
   d. opposed end wall members engaging said end edges;
   e. filter means in said housing spaced from each of said connecting portions and including spaced end portions one inserted in each of said connective joints between said leg portions to anchor said filter means to said housing members;
   f. gasket means disposed with said filter end portions in each of said connective joints to seal said joints and to seal said end portions therein; and
   g. means securing said filter means to said end wall members.

7. The structure of claim 6 wherein said filter means is a pleated filter element having end pleats forming said filter end portions, and wherein means are provided to space the pleats of said filter element on at least the inlet side thereof.

8. A filter assembly comprising, in combination:
   a. a housing including a pair of oppositely disposed housing members of equal length and a pair of inwardly flanged opposite end wall members, each housing member having a pair of spaced, outer, generally parallel wall-like leg portions extending from the edges of an apertured connecting wall portion toward the other member, the ends of the leg portions of one member being telescopically received in surface-to-surface apposition within the ends of the leg portions of the other member, and said end wall members being telescoped over the ends of said housing members so that the flanges urge the outer leg portions against the inner leg portions;
   b. sealing means extending along the sides of said housing and located between the outer surfaces of the inner ones of said pairs of leg portions and the inner surfaces of the outer ones of said pairs of leg portions;
   c. a filter element within said housing, including opposite end portions, said end portions being secured between a sealing means and a leg portion of the two sides of said housing to anchor said filter element to said housing members;
   d. and means sealingly securing the edges of said filter element to the inner surfaces of said end wall members.

* * * * *